United States Patent [19]

Fauteux et al.

[11] Patent Number: 5,604,056

[45] Date of Patent: Feb. 18, 1997

[54] ELECTROLYTIC CELL AND PROCESS FOR TREATING AN ALKALI METAL ELECTRODE

[76] Inventors: Denis G. Fauteux, 359 Arlington St., Acton, Mass. 01720; Martin Van Buren, 1 Jonathan La., Chelmsford, Mass. 01824; Jie Shi, 385 Mass Ave. #49, Arlington, Mass. 02174

[21] Appl. No.: 438,242

[22] Filed: May 9, 1995

[51] Int. Cl.$^6$ .................. H01M 4/62; H01M 4/60
[52] U.S. Cl. .................. 429/218; 429/212; 429/214; 429/216
[58] Field of Search ................... 429/218, 212, 429/216, 214, 137; 427/122, 195

[56] References Cited

U.S. PATENT DOCUMENTS

| | | | |
|---|---|---|---|
| 4,517,265 | 5/1985 | Belanger et al. | 429/216 |
| 4,624,902 | 11/1986 | de Neufville et al. | 429/194 |
| 4,684,583 | 8/1987 | Klinedinst et al. | 429/137 |
| 5,158,843 | 10/1992 | Batson et al. | 429/218 |
| 5,162,178 | 11/1992 | Ohsawa et al. | 429/218 |
| 5,314,765 | 5/1994 | Bates | 429/218 |
| 5,342,710 | 8/1994 | Koksbang | 429/218 |
| 5,366,829 | 11/1994 | Saidi | 429/218 |
| 5,387,479 | 2/1995 | Koksbang | 427/122 X |
| 5,434,021 | 7/1995 | Fauteux et al. | 429/216 |

OTHER PUBLICATIONS

Use of A–B Block Polymers as Dispersants for Non-Aqueous Coating Systems: Henry L. Jakubauskas, Pub. in J. Coatings Technology, vol. 58, No. 736 (May 1986) at pp. 71–82.

Fluorinated Surfactants as Additives for Lithium Batteries: Lemordant et al., Pub. in Power Sources, vol. 14 (1993) at pp. 69–80. (no month).

The Navy's Lithium Rechargeable Battery Program Part II Research into New or Improved Chemistries: James et al., Pub. in Progress in Batteries & Solar Cells, vol. 9 (1990) at pp. 238–243. (no month).

Conductivity of Crosslinked Poly (N–Vinylpyrrolidone) Gel Film Containing Surfactant as Electrolyte Salt: Tsutsumi et al., Pub. in J. Poly Sci, Part 4, Poly Chem. (1993), vol. 31, at pp. 2883–2886. (no month).

Suppression of Dendrite Formation During Cycling of Lithium Electrodes in Organic Electrolytes: Besenhard et al., Pub. in Proc. Electrochemical Soc., 1988, 88(L), at pp. 618–626. (no month).

Polymer Brushes: S. T. Milner, Pub. in Science, vol. 251 Feb. (1991), at pp. 905–914.

Cationic Polyelectrolyte Gel from Poly (Ethylenimine) : Hirata et al., Pub. in American Chemical Society, Chapter 27 (1994) at pp. 493–498 (paper received Sep. 7, 1993).

*Primary Examiner*—Stephen Kalafut
*Assistant Examiner*—Carol Chaney
*Attorney, Agent, or Firm*—Dick and Harris

[57] ABSTRACT

An electrolytic cell and process for treating an alkali metal electrode, wherein an additive is applied to the electrode so as to result in a predominately additive interface between the electrode and an electrolyte. The additive interface is ionically conductive yet non-ionic. In addition, the additive interface is substantially inert when in contact with the electrode, while being substantially insoluble in the electrolyte.

21 Claims, 3 Drawing Sheets

ELECTROLYTIC CELL AND PROCESS FOR TREATING AN ALKALI METAL ELECTRODE

BACKGROUND OF THE INVENTION

1. Field of the Invention

The present invention relates in general to electrolytic cells, and more particularly, an electrolytic cell and associated process for treating an alkali metal anode with an additive/surfactant.

2. The Prior Art

The use of additives/surfactants within an electrolytic cell, and, more particularly, within secondary lithium batteries, has been identified in the prior art as a possible means toward potential improvements of morphology and coulombic efficiency of an alkali metal source (such as lithium) electrode during cell cycling. While such prior art has touched on the hopeful results of additives/surfactants in, for example, rechargeable lithium batteries, the teaching in such prior art research appears to be in a direction which focuses on surfactants which are soluble in the associated electrolyte and/or which are reactive with the particular alkali metal (lithium) electrode. (See, for example, papers entitled: "THE U.S. NAVY'S LITHIUM RECHARGEABLE BATTERY PROGRAM PART II RESEARCH INTO NEW OR IMPROVED CHEMISTRIES," by S. James, P. Smith, T. Murphy and D. Cason-Smith, published on Pgs. 238–243 in *Progress in Batteries & Solar Cells*, Vol. 9 (1990); and "FLUORINATED SURFACTANTS AS ADDITIVES FOR LITHIUM BATTERIES," by D. Lemordant, A. Tudela Ribes and P. Willmann, published on Pgs. 69–80 in *Power Sources*, Vol. 14 (1992)).

Although attempts have been made to utilize and fully understand the effects of additives/surfactants in secondary lithium cells, the associated research and experimentation disclosed in the prior art have identified the need of such surfactants to have specific chemical properties. Unfortunately, such chemical properties have not yet proven to result in a rechargeable battery having the anticipated advantages which such additives/surfactants should theoretically (according to such prior art research) provide.

It is thus an object of the present invention to provide an electrolytic cell and associated process wherein the additive applied to the alkali metal electrode (which is to be used in a rechargeable battery), results in a predominantly additive interface which contributes to, among other things, a substantial increase in interfacial capacitance and, a substantial decrease in interfacial resistance, so as to increase the cyclability and efficiency of the cell.

These and other objects of the present invention will become apparent in light of the present Specification, Claims and Drawings.

SUMMARY OF THE INVENTION

The present invention comprises an electrolytic cell having a first electrode constructed with an alkali metal ion source (such as lithium), a second electrode and an electrolyte, wherein the first electrode includes a surface adjacent the electrolyte. An additive is applied to a portion of the surface of the first electrode so as to result in a predominately additive interface between the surface of the first electrode and the electrolyte. The additive interface possesses the following characteristics, namely it is: ionically conductive relative to the particular ions associated with the alkali metal ion source of the first electrode; non-ionic; and is substantially inert when in contact with the alkali ion metal source of the first electrode. Although the term additive has been used, it will be understood to those with ordinary skill in the art, that such a term may be representative of a surfactant as well.

In a preferred embodiment of the invention, the additive interface is further substantially non-soluble in the associated electrolyte.

The electrolytic cell further comprises means for polymerizing the additive after the additive has been applied to at least a portion of the surface of the first electrode. Furthermore, means are also contemplated for substantially suppressing dendritic growth on the first electrode. Such dendritic growth suppression means may include carbon particles operatively applied to at least a portion of the alkali metal ion source of the first electrode.

In another preferred embodiment of the invention, the electrolytic cell comprises a first electrode constructed with an alkali metal ion source, a second electrode, an electrolyte and an interface operatively positioned adjacent at least a portion of the alkali metal ion source and at least a portion of the electrolyte. Means are operatively associated with the interface for increasing the capacitance of the first electrode beyond 10 $\mu$F/cm$^2$. Such capacitance increasing means may comprise an additive, such as previously described.

The present invention also comprises a process for treating an electrode for use in an electrolytic cell, wherein the electrode includes a surface to be positioned adjacent an electrolyte and wherein the electrode is constructed with an alkali metal ion source, such as lithium. The process comprises the steps of a) applying carbon particles to at least a portion of the surface of the electrode; and b) applying an additive to the carbon particles and also to the surface of the electrode which is not covered by the carbon particles, so as to result in an additive/carbon interface adjacent the surface of the electrode and at least a portion of the electrode. Such an additive may be fabricated from a material which is: ionically conductive relative to the particular ions associated with the alkali metal ion source of the electrode; non-ionic; substantially inert when in contact with the alkali metal ion source of the electrode; and, substantially non-soluble in the electrolyte.

In a preferred embodiment of the invention, the step of applying an additive to the carbon particles comprises the step of coating the carbon particles prior to the step of applying carbon particles to the surface of the electrode.

In another preferred embodiment, the step of applying an additive to the carbon particles comprises the steps of a) adding the additive to the electrolyte; and b) adsorbing the additive on the carbon particles upon initial cycling of the electrolytic cell. It is also contemplated that the process includes the step of polymerizing the additive after the step of applying the additive to the carbon particles and then to the surface of the electrode.

BEST MODE FOR CARRYING OUT THE INVENTION

Figure 1:
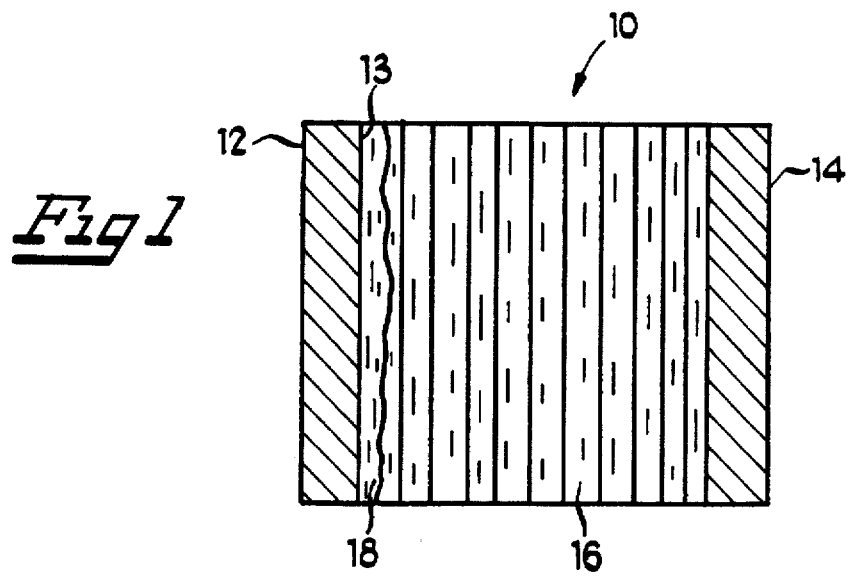
FIG. 1 is a diagram of the secondary electrolytic cell of the present invention.

While this invention is susceptible of embodiment in many different forms, there is shown in the drawings and will herein be described in detail, two specific embodiments with the understanding that the present disclosure is to be considered as an exemplification of the principles of the invention and is not intended to limit the invention to the embodiments illustrated.

Electrolytic cell 10 is shown in FIG. 1 as comprising first electrode 12 having surface 13, second electrode 14, electrolyte 16 and surfactant/additive 18. In a preferred embodiment, first electrode 12 is constructed with lithium, although other alkali metal sources are likewise contemplated for use. Furthermore, although not intended to be limiting, the present invention will be described in the context of a rechargeable lithium battery with the understanding that other types of electrolytic cells are also contemplated by the present disclosure.

Additive 18 is comprised of a material which has several desired properties. First, additive 18 must be ionically conductive relative to the particular ions associated with the alkali metal ion source of first electrode 12, which, in the present case, are lithium ions. Accordingly, such ionic conductivity will serve to allow for substantially unhindered permeation/movement of lithium ions during cycling of the battery.

Additive 18 should also be non-ionic so that the additive is relatively unaffected by electrical fields which are continually imposed within electrolytic cell 10. Indeed, one of the objects of the present invention is to preclude migration of additive 18 away from surface 13 of first electrode 12; an object which would be circumvented if the additive was ionic—due to an ionic material's nature to migrate in the direction of an electrical field and/or as the result of polarization.

Additive 18 should likewise be substantially insoluble with the associated electrolyte so as to avoid inadvertent absorption within the electrolyte. Furthermore, inasmuch as various alkali metals can be quite reactive, it is also desired that the additive be substantially inert with respect to the particular alkali metal source.

Figure 3:
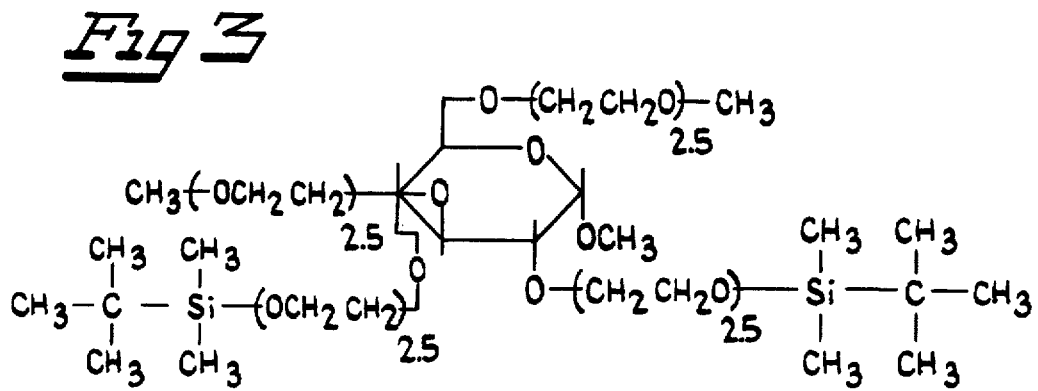
FIG. 3 is a chemical structure.

Examples of additives/surfactants acceptable for practicing the claimed and described invention include, but are not limited to, E-10(Me)$_2$(t-BuMe$_2$Si)$_2$, the chemical structure of which is shown in FIG. 3; polyethylene glycol (having an average molecular weight of 400) dimethyl ether; PLURONIC L-92 dimethyl ether synthesized using the commercially available PLURONIC L-92 from BASF Corp. of Parsippany, N.J., as the starting component; and, a surfactant sold under the tradename SILWET L7602, which is commercially available from OSi Specialties Inc. of Danbury Conn. Although not necessary, it is also contemplated that additive 18 be polymerizable after it has been applied to surface 13 of first electrode 12.

As can be seen in FIG. 1, additive 18 is operatively applied to surface 13 of first electrode 12 so as to result in a predominately additive interface adjacent electrolyte 16. As will be explained in greater detail, the additive interface, having the above-identified properties (other than the ability to be polymerizable), will actually serve to increase the capacitance of first electrode 12 beyond the known usual capacitance of an electrode constructed with lithium, for example, and, more particularly, beyond 10 μF/cm$^2$.

Figure 2:
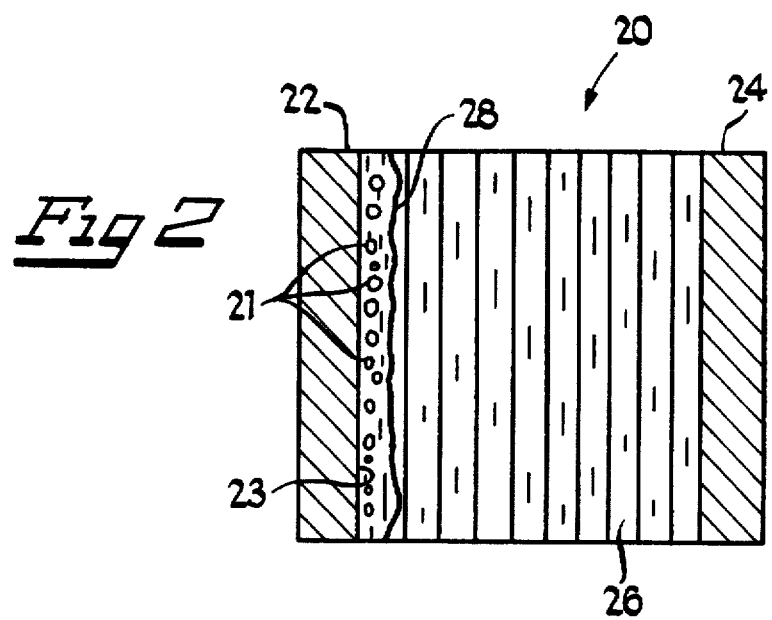
FIG. 2 is a diagram of another preferred embodiment of the secondary electrolytic cell of the present invention.

Another preferred embodiment of electrolytic cell 20 is shown in FIG. 2 wherein carbon particles 21 are operatively applied to surface 23 of first electrode 22. In this preferred embodiment, the carbon particles are applied to surface 23 in a non-continuous/interrupted orientation, and additive 28 (having the same properties as previously discussed with respect to additive 18 of FIG. 1), is operatively applied to carbon particles 21 and also to surface 23 of first electrode 22. Such a non-continuous orientation of the applied carbon particles contributes to the suppression of dendritic growth on the first electrode, while the additive serves to increase capacitance and decrease resistance thereto. Actual application of the carbon particles to surface 23 of first electrode 22 can be accomplished by various techniques such as argon spraying, brushing or vacuum coating, to name a few.

After the carbon particles have been operatively applied to the surface of the first electrode, the additive may then be applied in several ways. For example, the additive may be applied/coated directly over the carbon particles and also over the regions of surface 23 which are not covered by the carbon particles, or, the additive may be added to the electrolyte where upon it will become adsorbed on the carbon particles and non-carbon covered regions of the surface of the first electrode upon initial cycling of electrolytic cell 20. As will be explained in greater detail, it is also contemplated that the carbon particles and additive be mixed together and then applied to the surface of the electrode together.

Also shown in FIG. 2 are electrolyte 26 and second electrode 24. It is contemplated that the electrolyte in the embodiment of FIG. 2, as well as in FIG. 1, comprise a gel, a liquid or even a polymer. Any number of different electrolytes could be used in the electrolytic cell and would be easily determined by one with ordinary skill in the art having the present disclosure before them.

In support of the benefits of electrolytic cell 10 (FIG. 1) and electrolytic cell 20 (FIG. 2), and, more particularly, the benefits associated with the novel use of the claimed and described electrolytic cell which uses an additive having the above-identified chemical properties, ten experiments were carried out. In each of these experiments, it was discovered that the additives resulted in a predominately additive interface which greatly increased interfacial capacitance of the first electrode well beyond 10 μF/cm$^2$, while also serving to greatly reduce interfacial resistance as well. The results and summaries of these experiments follow hereinbelow:

At the outset, it should be noted that Experiment Nos. 1 through 5 utilized a three electrode electrolytic cell having the following common characteristics:

- a working electrode constructed from a 4 mil piece of lithium foil having an area of 4.9 cm$^2$;
- a lithium counter electrode;
- a lithium reference electrode; and
- a glass fiber separator which separated the electrodes, and which was filled with an electrolyte comprised of 1 M LiClO$_4$ in propylene carbonate.

Furthermore, in each of these first five Experiments, the interfacial resistance between the lithium working electrode and the particular electrolyte was measured by AC impedance spectroscopy using a Solartron Frequency Response Analyzer 1250 connected to a Solartron Electrochemical Interface 1286. The change of the interfacial resistance and capacitance, for each cell in each of Experiment Nos. 1 through 5 were then observed and recorded. The results of such Experiments are shown in Table I, which follows the information relative to Experiment Nos. 1 through 5.

In addition to the above common elements and test procedures, the following characteristics were unique in each respective Experiment:

EXPERIMENT NO. 1

In this Experiment, neither the electrolytic cell nor the working electrode, was treated with any type of additive. The results of this Experiment are shown in Table I hereinbelow under the additive designation "None."

EXPERIMENT NO. 2

In this Experiment, an E-10(Me)$_2$(t-BuMe$_2$Si)$_2$ additive, (as shown in FIG. 3), of approximately 5% by volume of the electrolyte, was added to the electrolyte. The results of this Experiment are shown in Table I hereinbelow under the additive designation "EMBSi."

EXPERIMENT NO. 3

In this Experiment, a Pluronic L-92 dimethyl ether additive, of approximately 5% by volume of the electrolyte, was added to the electrolyte. The results of this Experiment are shown in Table I hereinbelow under the additive designation "Me$_2$L-92."

EXPERIMENT NO. 4

In this Experiment, a surfactant commercially known as Silwet L7602, of approximately 5% by volume of the electrolyte, was added to the electrolyte. The results of this Experiment are shown in Table 1 hereinbelow under the additive designation "L7602."

EXPERIMENT NO. 5

In this Experiment, a polyethylene glycol (having a molecular weight of 400) dimethyl ether, of approximately 5% by volume of the electrolyte, was added to the electrolyte. The results of this Experiment are shown in Table I hereinbelow under the additive designation "PEG(400)DME."

In Experiment Nos. 6 through 8, a three electrode cell, similar to the one used in Experiment No. 1, was constructed. However, in each of these three Experiments, the lithium surface of the working electrode was modified to include carbon particles for suppression of dendritic growth. In particular, the lithium surface in each of these Experiments was coated with 0.03 mg/cm$^2$ of a non-continuous/interrupted layer of 100% compressed carbon black particles (available from Chevron Chemical Co. of Houston, Tex., under the trade name CHEVRON C-100) wherein the coating was applied from a suspension of 1.5 g of the carbon in approximately 200 g of heptane using known argon spraying techniques.

The change of the interfacial resistance and capacitance, for each cell in each of Experiment Nos. 6 through 8, were then observed (as was done with respect to Experiment Nos. 1 through 5) and recorded. The results of such Experiments are shown in Table II, which follows the information relative to Experiment Nos. 6 through 8.

In addition to the above common elements and applications, the following characteristics were unique to each respective Experiment:

EXPERIMENT NO. 6

In this Experiment, neither the electrolytic cell nor the working electrode, was treated with any type of additive. The results of this Experiment are shown in Table II hereinbelow under the additive designation "None."

EXPERIMENT NO. 7

In this Experiment, approximately 1 g of E-10(Me)$_2$(t-BuMe$_2$Si)$_2$ was also suspended in the heptane, along with the carbon particles, and then collectively sprayed onto the lithium surface. The results of this Experiment are shown in

TABLE I

| Experiment No. 1 | Additive | Time (hour) | | | | | | | |
|---|---|---|---|---|---|---|---|---|---|
| | | 0 | | 24 | | 48 | | 72 | |
| | | R $\Omega$ cm$^2$ | C $\mu$F/cm$^2$ | R $\Omega$ cm$^2$ | C $\mu$F/cm$^2$ | R $\Omega$ cm$^2$ | C $\mu$F/cm$^2$ | R $\Omega$ cm$^2$ | C $\mu$F/cm$^2$ |
| 1 | None | 38.7 | 2.36 | 74.5 | 2.22 | 86.0 | 2.43 | 111.8 | 3.00 |
| 2 | EMBSi | 42.0 | 2.45 | 9.02 | 23.0 | 10.4 | 25.5 | 10.8 | 24.5 |
| 3 | Me$_2$L-92 | 75.0 | 2.18 | 20.5 | 12.9 | 18.9 | 14.0 | 20.9 | 12.6 |
| 4 | L7602 | 130.8 | 1.61 | 21.6 | 9.76 | 23.5 | 11.3 | 21.8 | 12.1 |
| 5 | PEG(400)DME | 38.0 | 1.75 | 21.6 | 978 | | | 24.0 | 11.1 |

As can be clearly observed from Table I, an additive having the claimed and described chemical characteristics, when used in combination with an alkali metal electrode, and, more particularly, a lithium source electrode, results in a substantial increase in the interfacial capacitance and a substantial decrease in interfacial resistance, of the lithium electrode, compared to that of an untreated electrode. As also observed, the interfacial capacitance, in each case where the additive had been used, was well beyond 10 $\mu$F/cm$^2$.

Table II hereinbelow under the additive designation "EMBSi."

EXPERIMENT NO. 8

In this Experiment, approximately 1 g of polyethylene glycol (having a molecular weight of 400) dimethyl ether was also suspended in the heptane, along with the carbon particles, and then collectively sprayed onto the lithium surface. The results of this Experiment are shown in Table II hereinbelow under the additive designation "PEG(400)DME."

TABLE II

| Experiment No. 2 | Additive | Time (hour) | | | | | | | |
|---|---|---|---|---|---|---|---|---|---|
| | | 0 | | 24 | | 48 | | 72 | |
| | | R Ω cm$^2$ | C μF/cm$^2$ | R Ω cm$^2$ | C μF/cm$^2$ | R Ω cm$^2$ | C μF/cm$^2$ | R Ω cm$^2$ | C μF/cm$^2$ |
| 6 | None | 5.05 | 1.67 | 3.04 | 69.2 | | | 3.28 | 79.2 |
| 7 | EMBSi | 59.3 | 2.18 | 1.67 | 245 | 1.71 | 239 | 1.76 | 294 |
| 8 | PEG(400)DME | 38.6 | 2.67 | 2.6 | 99.6 | 2.4 | 107 | 2.54 | 102 |

As can be observed from Table II, the use of an additive having the Claimed and described chemical characteristics, in combination with the carbon black particles, also resulted in a substantial increase in interfacial capacitance, and a substantial decrease in interfacial resistance, of a lithium electrode, compared to that of an untreated electrode. As also observed, the interfacial capacitance, in each case where the additive had been used, was well beyond 10 μF/cm$^2$.

In EXPERIMENT NOS. 9 and 10, a two electrode cell was assembled.

The cell included:
  two lithium electrodes each having an area of approximately 5.14 cm$^2$;
  a polypropylene ring, having an approximate thickness of 5 mm, separating the two electrodes; and
  - an electrolyte comprised of 1M LiClO$_4$ in propylene carbonate. However, with respect to Experiment No. 9, no additive was used, while in Experiment No. 10, an E-10(Me)$_2$(t-BuMe$_2$Si)$_2$ additive (See FIG. 3), of approximately 5% by volume of the electrolyte, was added to the electrolyte.

Figure 4:
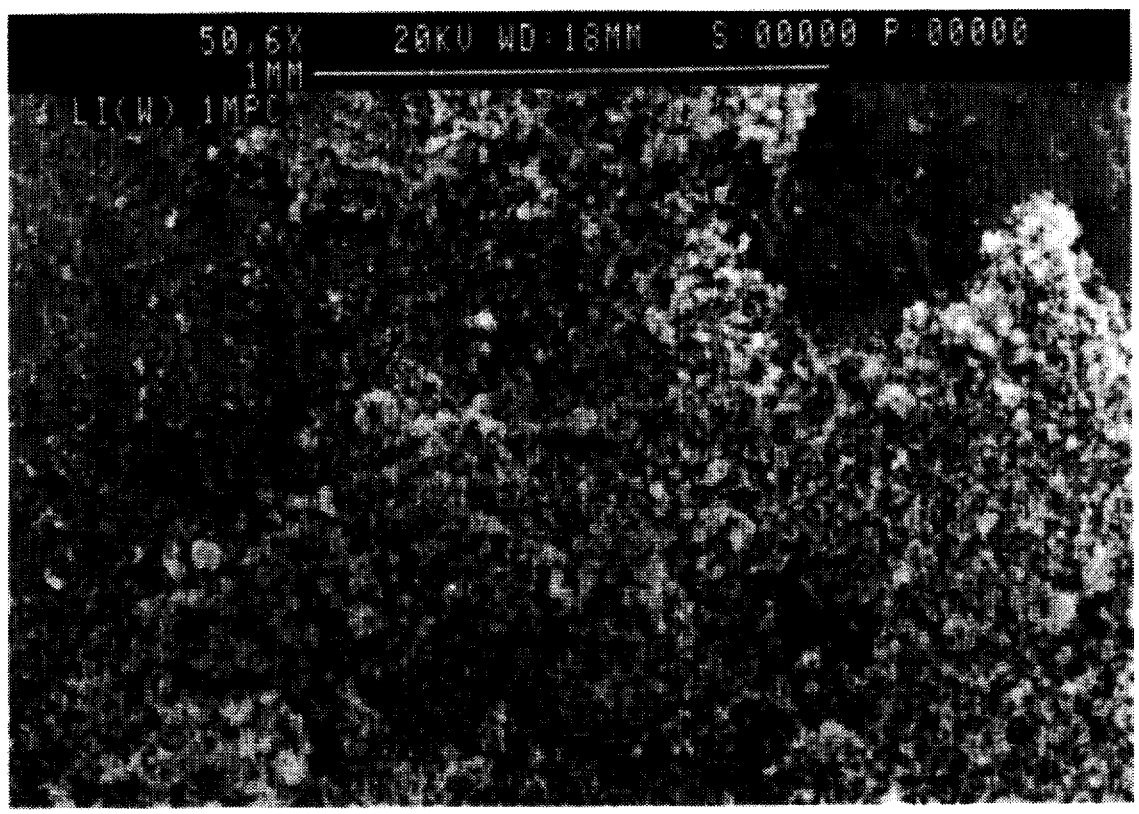
FIG. 4 is a micro photograph of a lithium electrode.
Figure 5:
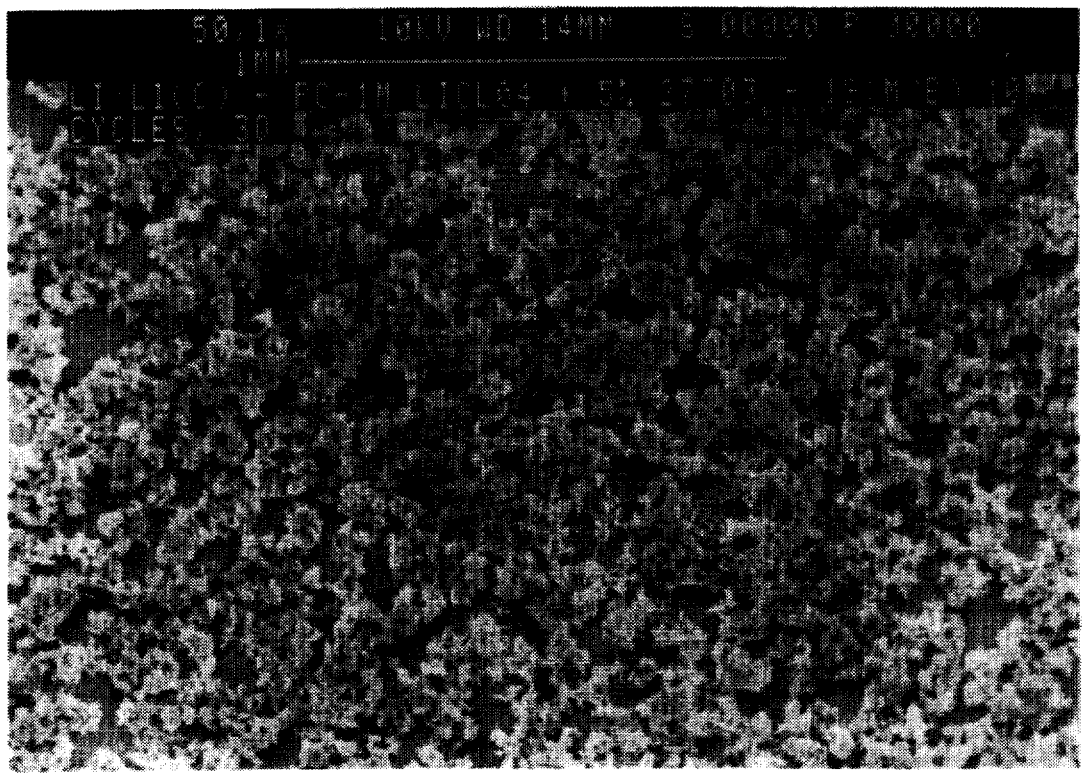
FIG. 5 is a micro photograph of a lithium electrode.

Both cells (in Experiment Nos. 9 and 10) were then cycled using an alternating current of +/−4.290 mA at one hour intervals. After ten complete cycles, the cells were disassembled and the electrodes washed three times with dimethyl carbonate. After the washings, the electrodes were vacuum dried. The morphology of both of the cells were then observed through a scanning electron microscope. Photographs of the observations of the cell of Experiment No. 9 (no additive)is shown in FIG. 4, and, the cell of Experiment No. 10 (with the additive) is shown in FIG. 5—clearly showing far less degradation to the electrode treated with the claimed and described additive.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. An electrolytic cell comprising:
  a first electrode constructed with an alkali metal ion source, a second electrode and an electrolyte, wherein the first electrode includes a surface adjacent the electrolyte; and
  a surfactant applied to at least a portion of the surface of the first electrode so as to result in a predominantly surfactant interface between the surface of the first electrode and the electrolyte, wherein the surfactant interface is: ionically conductive relative to the particular ions associated with the alkali metal ion source of the first electrode; non-ionic; and is inert when in contact with the alkali metal ion source of the first electrode.

2. The electrolytic cell according to claim 1, wherein the surfactant interface is further non-soluble in the electrolyte.

3. The electrolytic cell according to claim 2, wherein the alkali metal ion source of the first electrode includes a source of lithium ions.

4. The electrolytic cell according to claim 1, further comprising means for polymerizing the surfactant after the surfactant has been applied to the at least a portion of the surface of the first electrode.

5. The electrolytic cell according to claim 2, further comprising means for polymerizing the surfactant after the surfactant has been applied to the at least a portion of the surface of the first electrode.

6. The electrolytic cell according to claim 1, wherein the alkali metal ion source of the first electrode includes a source of lithium ions.

7. The electrolytic cell according to claim 1, further comprising means for substantially suppressing dendritic growth on the first electrode wherein the dendritic growth suppression means includes carbon particles applied to at least a portion of the alkali metal ion source of the first electrode.

8. The electrolytic cell according to claim 1, wherein the first electrode comprises a lithium metal anode.

9. An electrolytic cell comprising:
  a first electrode constructed with an alkali metal ion source, a second electrode, an electrolyte and an interface operatively positioned adjacent at least a portion of the alkali metal ion source of the first electrode and at least a portion of the electrolyte;
  means associated with the interface for increasing the capacitance of the first electrode beyond 10 μF/cm$^2$ .

10. The electrolytic cell according to claim 9 wherein the capacitance increasing means comprises a surfactant which is: ionically conductive relative to the particular ions associated with the alkali metal ion source of the first electrode; non-ionic; and is inert when in contact with the alkali metal ion source of the first electrode.

11. The electrolytic cell according to claim 10, wherein the surfactant is further non-soluble in the electrolyte.

12. The electrolytic cell according to claim 10, wherein the alkali metal ion source of the first electrode includes a source of lithium ions, contact with the alkali metal ion source of the first electrode; and, is substantially non-soluble in the electrolyte.

13. The electrolytic cell according to claim 9, further comprising means for substantially suppressing dendritic growth on the first electrode wherein the dendritic growth suppression means includes carbon particles associated with the capacitance increasing means and at least a portion of the alkali metal ion source of the first electrode.

14. An electrolytic cell comprising:
   a first electrode constructed with an alkali metal ion source, a second electrode and an electrolyte, wherein the first electrode includes a surface adjacent the electrolyte; and
   a surfactant applied to at least a portion of the surface of the first electrode so as to result in a predominantly surfactant interface between the surface of the first electrode and the electrolyte, wherein the surfactant interface is: ionically conductive relative to the particular ions associated with the alkali metal ion source of the first electrode; non-ionic; is inert when in contact with the alkali metal ion source of the first electrode; and, is substantially non-soluble in the electrolyte.

15. The electrolytic cell according to claim 14, wherein the first electrode comprises a lithium metal anode.

16. A process for treating an electrode for use in an electrolytic cell, wherein the electrode includes a surface to be positioned adjacent an electrolyte and wherein the electrode is constructed with an alkali metal ion source, the process comprising the steps of:
   applying carbon particles to at least a portion of the surface of the electrode; and
   applying a surfactant to the carbon particles and also to the surface of the electrode which is not covered by the carbon particles so as to result in a surfactant/carbon interface adjacent the surface of the electrode and at least a portion of the electrolyte.

17. The process according to claim 16, wherein the surfactant to be applied is fabricated from a material which is: ionically conductive relative to the particular ions associated with the alkali metal ion source of the electrode; non-ionic; is substantially inert when in contact with the alkali metal ion source of the electrode; and, is substantially non-soluble in the electrolyte.

18. The process according to claim 16, wherein the step of applying a surfactant to the carbon particles comprises the step of coating the carbon particles prior to the step of applying the carbon particles to the surface of the electrode.

19. The process according to claim 16, wherein the step of applying a surfactant to the carbon particles comprises the steps of:
   adding the surfactant to the electrolyte; and
   adsorbing the surfactant on the carbon particles upon initial cycling of the electrolytic cell.

20. The process according to claim 16 further comprising the step of polymerizing the surfactant after the step of applying the surfactant to the carbon particles and then to the surface of the electrode.

21. The process according to claim 16 further including the step of constructing the electrode from lithium metal.

* * * * *

UNITED STATES PATENT AND TRADEMARK OFFICE
CERTIFICATE OF CORRECTION

PATENT NO. : 5,604,056
DATED : February 18, 1997
INVENTOR(S) : Fauteux et al.

It is certified that error appears in the above-indentified patent and that said Letters Patent is hereby corrected as shown below:

| | |
|---|---|
| Col. 4, line 45 | After "5" and before "utilized" a space needs to be inserted |
| Col. 7, line 44 | After ")" and before "is" a space needs to be inserted |
| Col. 8, line 59 | After "ions" insert a "." and delete ", contact with the alkali metal ion source of the first electrode; and, is substantially non-soluble in the electrolyte." |

Signed and Sealed this

First Day of July, 1997

Attest:

Attesting Officer

BRUCE LEHMAN

Commissioner of Patents and Trademarks